Patented Feb. 3, 1942

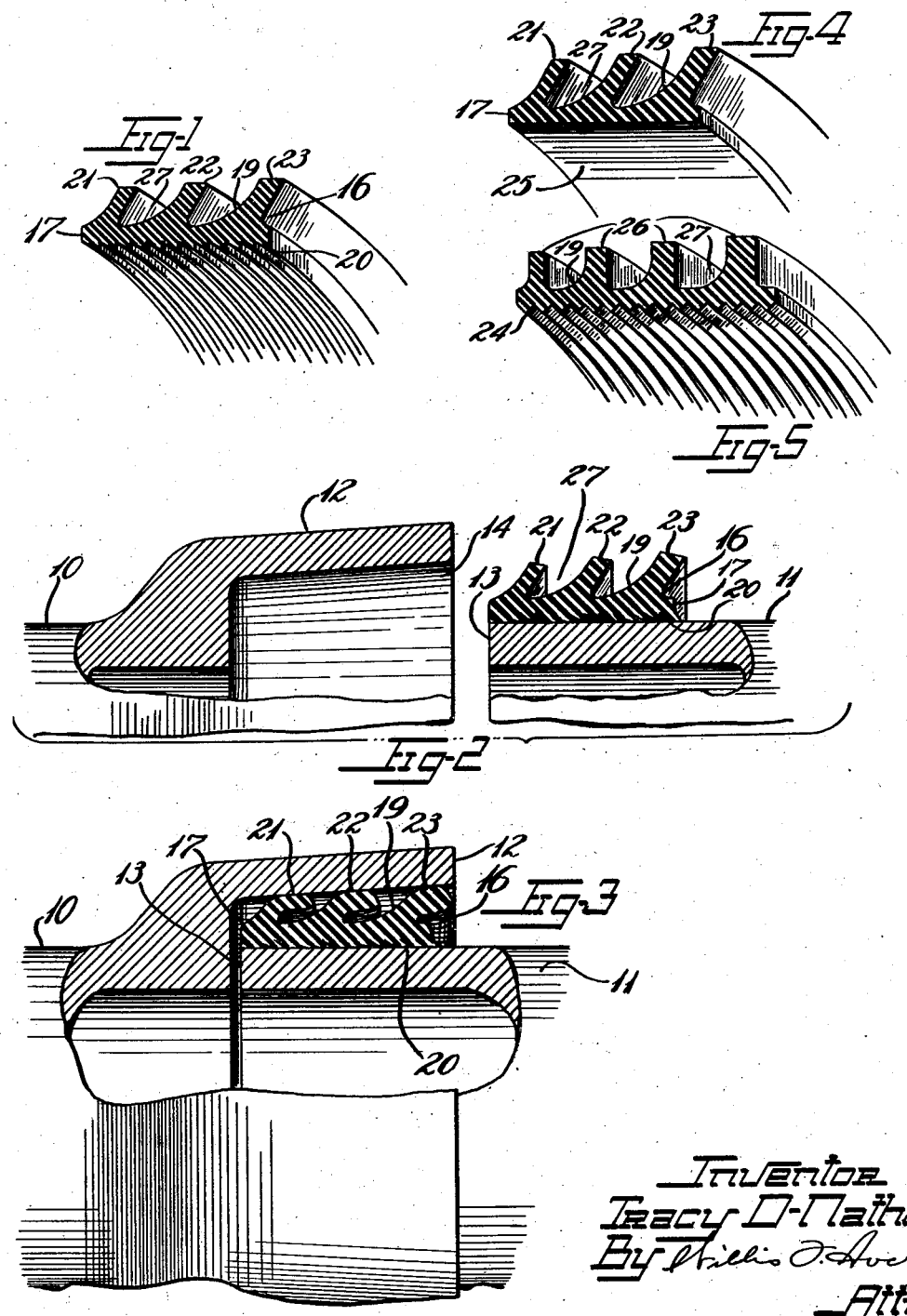

2,271,777

UNITED STATES PATENT OFFICE 2,271,777

SEALING STRUCTURE

Tracy D. Nathan, Cuyahoga Falls, Ohio, assignor to The B. F. Goodrich Company, New York, N. Y., a corporation of New York Application April 25, 1939, Serial No. 269,874

8 Claims. (Cl. 288—19)

This invention relates to sealing structures for use between male and female joint members such as the concentric bell and spigot members or pipe and sleeve members of suctional pipe lines.

When pipe sections are sealed by use of rigid cement or other rigid sealing means, the line lacks flexibility, and expansion and contraction due to changes in temperature becomes an important problem. Where such pipe lines are buried in the soil, such as in sewers and drains, settling of the soil, shifting of the soil, and disturbances by reason of frosts, and line pull often causes breaking of the joints and sometimes of the pipe sections.

While it has been proposed to employ sealing members of asphalt and similar bituminous and thermoplastic materials because of increased flexibility of the joints, such sealing members are not suitable at elevated temperatures and sewers and drains employing them cannot be used for conducting hot liquids. When such non-resilient materials become warm they run out of the joint and never return.

Furthermore bituminous materials are soluble or pervious to many fluids such as oils, solvents, and certain acids and alkalis, and cannot be employed where these are present. The construction of pipe lines must often be accomplished under water and in cramped working quarters where it becomes difficult or impossible to constrict a bituminous joint.

Where the thermoplastic material is mixed with fibrous materials or pigments to reduce its flow under elevated temperatures, sealing members made thereof require such force to place them in the joint as to cause breakage of the pipe members, and the joints are too stiff to accommodate expansion and contraction causing the joints to open under movement of the pipe line.

In my prior Patent No. 2,032,492, issued March 3, 1936, and entitled Pipe joint assembly, I have disclosed a resilient annular sealing member of rubber which has been successfully used in many installations of pipe lines where the pipe members have been selected to conform to close standards of dimensions and shape. While conformity to standards is readily attained in fabricated, machined, or carefully cast metallic pipes and may be attained in the manufacture of ceramic pipe, concrete pipe or ordinary cast metal pipe by careful supervision, it has become desirable to provide a resilient sealing structure of rubber-like material permitting greater variation in roundness and dimensions of the pipe so as to be adapted for use with the ordinary run of ceramic pipe, cement pipe, and sand cast metallic pipe.

The principal objects of the present invention are to provide resilient accommodation to great variation of dimensions and shape of the pipe members, to provide and maintain efficient sealing, to provide ease of installation, to provide line flexibility, and to provide simplicity of construction.

These and other objects will appear from the following description and the accompanying drawing.

Of the drawing:

Fig. 1 is a perspective view of a section of the sealing structure in its preferred form.

Fig. 2 is a view of adjoining pipe members before assembly showing the sealing structure mounted on the spigot of one of the pipe members, before assembly of the joint, parts being broken away and parts shown in section.

Fig. 3 is a similar view of the assembled joint.

Fig. 4 is a perspective view similar to Fig. 1, showing another embodiment of the invention.

Fig. 5 is a similar view showing a further embodiment of the invention.

Referring to the drawing and especially to Figs. 2 and 3, the numerals 10 and 11 designate a pair of adjacent pipe members, the member 10 having a bell 12 for receiving the spigot 13 of the number 11 and its surrounding sealing structure, the bell 12 having a counterbored space 14 providing an annular space about the spigot of the member 11 for the sealing structure 16. The annular space is usually, although not necessarily tapered in thickness, due to taper of the counterbore as indicated in Figs. 2 and 3. The sealing structure 16 may accordingly be of tapered construction or straight according to the space it is to occupy.

The sealing structure 16 as shown separately in Fig. 1, comprises an annular ring of resilient rubber-like material, preferably of vulcanized rubber composition, in the form of a relatively flat annular resilient band 17 adapted to closely embrace the spigot, and annular outwardly directed integral resilient flanges 21, 22, 23, adapted to be deflected therealong and to engage the surface of the bell.

In order to provide accommodation to great variation of dimensions and concentricity of the bell and spigot walls defining the sealing space, the band 17 is made as thin as permissible with regard to necessary strength and resistance to deformability, thereby permitting maximum height of the flanges 21, 22, 23, so that the flanges may be folded toward or against the band in a minimum thickness of annular space of the common run of pipe but may not stand undeflected from the band in the maximum thickness of annular space of the same pipe. The thickness of the band 17 should usually be considerably less than one half the total thickness of the band plus the height of the flanges, and may be even less than one third thereof depending upon the amount of variation in the pipe and the pressures to be employed therein, it being desirable to keep the band thin in case maximum tolerances are experienced.

The flanges 21, 22, 23, should be of such height as to be deflected from their normal position entirely around the bell so that each flange seals against the surface of the bell even where the diameter of the bell is at the high limit of standard or exceptionally nonconcentric. The flanges are of such thickness and are so spaced-apart axially as to permit being folded along the band in the narrowest annular space encountered. In some cases the space between the male pipe member and the female pipe member is tapered in thickness, as indicated in Figs. 2 and 3, and it is desirable to employ a series of flanges progressively varying in thickness and/or height, the lower thinner flanges being used in the narrower part of the space and the higher thicker flanges being at the wider part of the space, as in Figs. 1 to 3 where the flanges are numbered 21, 22 and 23 in order of their respective thickness and height, the flange 23 being the thickest and highest. To provide greater resistance to deflection, a radius or fillet 19 may be provided where one side of a flange joins the band.

To provide for close fitting of the sealing structure about the spigot or male pipe member and for great frictional resistance to movement therealong, the sealing structure is preferably made smaller in circumference than the spigot so that it must be stretched thereover. When the flanges are inclined to the band stretching of the band about the spigot also causes a slightly greater inclination of the flanges, as indicated in Fig. 2, thereby counteracting any tendency of the flanges to buckle under circumferential compression when the sealing structure is forced into the bell. The percentage of stretch employed preferably is at least five per cent, although less stretch may be employed in some cases. In joints of large circumference, a greater amount of stretch should be employed than in joints of small circumference.

To provide for increasing the resistance of the annular member to movement axially of the male pipe member, the sealing member may be cemented to the pipe member. In most cases, however, such resistance may be attained by providing low saw tooth annular ribs on the interior surface of the sealing member, as in Fig. 1 where the ribs 20 have one radial side and one angular side, or as in Fig. 5 where each rib 24 has both sides angular. These ribs provide a series of pliable sealing lips or edges which seal the tensioned ring to the male pipe member irrespective of slight imperfections in the surface of the pipe, and help to increase friction by their conformity to and engagement with any such surface irregularities. Where the ribs are inclined on one side only, as in Fig. 1, their radial faces are preferably turned to face in the direction of the open end of the bell so that as they are somewhat flattened by the tension of the sealing member they are inclined outwardly of the joint whereby they resist movement of the sealing member in a direction out of the joint by toggle action where the spigot and sealing ring are moved axially into the bell and also after the joint is assembled, as any force tending to move the sealing ring in that direction would flex the ribs in a direction tending to make them more perpendicular to the surface of the pipe and thereby to increase the force between the surface of the pipe and the sealing member by a pawl-like action. The embodiment shown in Fig. 4 has a smooth inner surface 25 which may be cemented to the male pipe member.

Preferably, though not necessarily, the flanges 21, 22, 23 are inclined slightly to the axis of the pipe so that they offer less resistance to being forced into the bell, and are naturally inclined away from the mouth of the bell, rather than toward the bell, when the sealing member is stretched over the spigot or male pipe member, the initial inclination in the proper direction inducing some further inclination in the same direction so that the inclination is resiliently maintained. In Figs. 1 to 4 the flanges are shown as so initially inclined whereas in the embodiment of Fig. 5 the flanges 26 are at right angles to the axis of the pipe.

The radius or fillet 19 is preferably provided at the side of the flanges facing the bell or female pipe member or the side of the flanges which meet the band at an obtuse angle, as they are then subjected to tension and do not interfere substantially with deflection of the flanges along or against the band. The spaces 27 between the flanges are relatively great with respect to the width of the flanges and are such as to permit deflection of an adjacent flange toward the band without its contacting with the next adjacent flange and preferably so as to clear the fillet portion 19. This permits independent movement of each of the flanges and provides maximum accommodation to variations of the pipe in diameter and roundness, and this has the important advantage also of promoting independent flexing action of each flange so that maximum flexibility of the joint is provided while effective sealing is maintained.

The flanges are also of substantially uniform thickness from the base thereof to the outer margin so as to flex as a sheet of material and to occupy a minimum space when deflected toward the band.

While various resilient rubber-like materials, such as properly compounded rubber compositions, polymerized vinyl chloride compositions, neoprene composition, polymerized olefine polysulphide compositions, and butadiene polymers such as copolymers of butadiene and acrylic nitrile or other resilient rubber-like materials may be used for constructing the sealing member, depending upon the fluids to be handled, such compositions should have the proper physical characteristics of resiliency, density, and stiffness required. The geometric construction of the sealing member and the pressure encountered will determine the density and stiffness of the composition used in constructing the sealing member, it being ordinarily desirable to employ a stiffer composition with a thin band and thin high flanges than with a thicker band and lower and thicker flanges.

In assembling the joint, the sealing structure 16 is stretched over the spigot or male pipe member, and adjusted to proper position thereon before telescoping the members. Where the sealing member is to be cemented to the male pipe member, a coating of suitable cement may first be applied to the inner face of the band or to the pipe or both. With the sealing member in place, the spigot or male pipe member is forced axially into the bell or female pipe member, the flanges 21, 22, 23 of the sealing ring being deflected or inclined by the contact with the bell to a position more nearly parallel to the confining surface where each flange provides an individual endless seal against the surface of the female member and resists movement of the sealing member outwardly of the joint by its pawl action against the pipe surface.

In use, fluid pressure within the pipe and acting against the projected area of the entire resilient sealing member is resisted by the pawl action of both the flanges 21, 22, 23 against the female pipe member and the frictional resistance of the tensioned band 17 against the male pipe member, and also by the pawl action of the inclined saw tooth ribs 20 or 24 where these are employed. There is also a thickening of the band and of the flanges when fluid pressure is applied, as the resilient material is substantially incompressible volumetrically and any axial movement of the face of the sealing member subjected to pressure causes a radial expansion of the structure between its axially opposite faces and resistance against movement of the sealing member outwardly of the joint is cumulative from flange to flange.

Assembly of the joint may be accomplished without the use of special tools and in a minimum amount of space, as the sealing structure may be applied to the male end of a pipe section before assembly of the pipe sections in a ditch or other restricted space and the new section may be shoved in place by the use of a jack or other simple appliance. The inclination of the flanges outwardly of the bell assists in entering the male end of the pipe section. The wide spaces between the flanges permit bending of the flanges along the band without interference with each other and the fillet adjacent each band provides additional strength in resisting any force tending to eject the sealing structure from the joint. The tensioning of the band around the male end of the pipe prevents the sealing structure from sliding along the pipe when assembling the joint and assures sealing of the band to the male pipe member even when the flanges are inclined by the female member, and the ribs on the inner periphery assist in sealing the joint and increasing friction.

Modifications may be made without departing from the scope of the invention as it is defined by the following claims.

I claim:

1. A sealing structure for sealing an annular space between male and female pipe members, said structure comprising an endless annular band of resilient material adapted to be mounted in close engagement of one of its faces with a wall of one of the pipe members, and a plurality of annular flanges on the radially opposite face of the band in widely spaced relation and of substantial radial extent adapted to be deflected against the other of said pipe members in sealing relation therewith, said flanges on the one face of the band comprising at least half the radial thickness of said structure in its relaxed state, so as to provide extensive room at such side of the band for flexure of the flanges against the pipe wall to effect sealing despite wide variations in the size and shape of the pipe member.

2. A sealing structure for sealing an annular space between male and female pipe members, said structure comprising an endless annular band of resilient material adapted to be stretched upon the male pipe member, said band having a plurality of annular sealing lips of slight radial extent on its pipe engaging face, and a plurality of annular flanges on its outer face in widely spaced relation and of substantial radial extent, said flanges being adapted to be deflected in sealing contact with the female pipe member, said flanges on the one face of the band comprising at least half the radial thickness of said structure in its relaxed state, so as to provide extensive room at such side of the band for flexure of the flanges against the pipe wall to effect sealing despite wide variations in the size and shape of the pipe member.

3. A sealing structure for sealing an annular space between male and female pipe members, said structure comprising a thin endless annular band of smaller circumference than the outer surface of the male pipe member and adapted to be stretched thereupon under tension, and a plurality of radially extending circumferential sealing flanges on its outer face in widely spaced relation, said flanges being of greater outer circumference than the inner surface of the female pipe member when the sealing structure is in place on the male pipe member, said flanges on the one face of the band comprising at least half the radial thickness of said structure in its relaxed state, so as to provide extensive room at such side of the band for flexure of the flanges against the pipe wall to effect sealing despite wide variations in the size and shape of the pipe member.

4. A sealing structure for sealing an annular space between male and female pipe members, said structure comprising a thin endless annular band of smaller circumference than the outer surface of the male pipe member and adapted to be stretched thereupon under tension, a plurality of annular sealing ribs of slight radial extent on its inner face, and a plurality of outwardly extending circumferential sealing flanges on its outer face in widely spaced relation, said flanges being of greater outer circumference than the inner surface of the female pipe member when the sealing structure is in place on the male pipe member, said flanges on the one face of the band comprising at least half the radial thickness of said structure in its relaxed state, so as to provide extensive room at such side of the band for flexure of the flanges against the pipe wall to effect sealing despite wide variations in the size and shape of the pipe member.

5. A sealing structure for sealing an annular space between male and female pipe members, said structure comprising a thin endless annular band of smaller circumference than the outer surface of the male pipe member and adapted to be stretched thereupon under tension, and a plurality of outwardly extending circumferential sealing flanges on its outer face defining spaces therebetween of greater width than the depth of the flanges, said flanges being of greater radial extent than the thickness of the band and being of greater outer circumference than the inner surface of the female pipe member when the sealing structure is in place on the male pipe member, said flanges on the one face of the band comprising at least half the radial thickness of said structure in its relaxed state, so as to provide extensive room at such side of the band for flexure of the flanges against the pipe wall to effect sealing despite wide variations in the size and shape of the pipe member.

6. A sealing structure for sealing an annular space between male and female pipe members, said structure comprising a thin endless annular band of smaller circumference than the outer surface of the male pipe member and adapted to be stretched thereover under tension, and a plurality of outwardly extending circumferential sealing flanges on its outer face, each flange being of substantial uniform thickness throughout, said flanges being separated by spaces of greater width than the height of the adjacent flanges, and said flanges being of greater outer circumference than the inner surface of the female pipe member when the sealing structure is stretched to the size of the male pipe member, said flanges on the one face of the band comprising at least half the radial thickness of said structure in its relaxed state, so as to provide extensive room at such side of the band for flexure of the flanges against the pipe wall to effect sealing despite wide variations in the size and shape of the pipe member.

7. A sealing structure for sealing an annular space between male and female pipe members, said structure comprising a thin endless annular band of smaller circumference than the outer surface of the male pipe member and adapted to be stretched thereover under tension, and a plurality of outwardly extending circumferential sealing flanges on its outer face, each flange being of substantially uniform thickness throughout, a fillet on one side of each flange merging the flange with the band, said flanges being separated by spaces of greater width than the height of the adjacent flanges, and said flanges being of greater outer circumference than the inner surface of the female pipe member when the sealing structure is stretched to the size of the male pipe member, said flanges on the one face of the band comprising at least half the radial thickness of said structure in its relaxed state, so as to provide extensive room on such side of the band for flexure of the flanges against the pipe wall to effect sealing despite wide variations in the size and shape of the pipe member.

8. A sealing structure for sealing an annular space between male and female pipe members, said structure comprising a band of resilient material having a thickness less than one-half the thickness of said space, and a plurality of outwardly extending circumferential flanges on said band, said flanges being of less axial thickness than the radial thickness of the space less the radial thickness of the band and being separated by spaces of greater width than the radial height of the flanges, the radial height of said flanges plus the radial thickness of the band being greater than the radial thickness of said space, so as to provide extensive room at such side of the band for flexure of the flanges against the pipe wall to effect sealing despite wide variations in the size and shape of the pipe member, and said band being of less circumference than the male member of the pipe and being adapted to be stretched thereupon under tension.

TRACY D. NATHAN.

CERTIFICATE OF CORRECTION.

Patent No. 2,271,777. February 3, 1942.

TRACY D. NATHAN.

It is hereby certified that error appears in the printed specification of the above numbered patent requiring correction as follows: Page 2, first column, line 56, after the word "annular" insert --sealing--; and that the said Letters Patent should be read with this correction therein that the same may conform to the record of the case in the Patent Office.

Signed and sealed this 1st day of December, A. D. 1942.

(Seal)

Henry Van Arsdale,
Acting Commissioner of Patents.